UNITED STATES PATENT OFFICE.

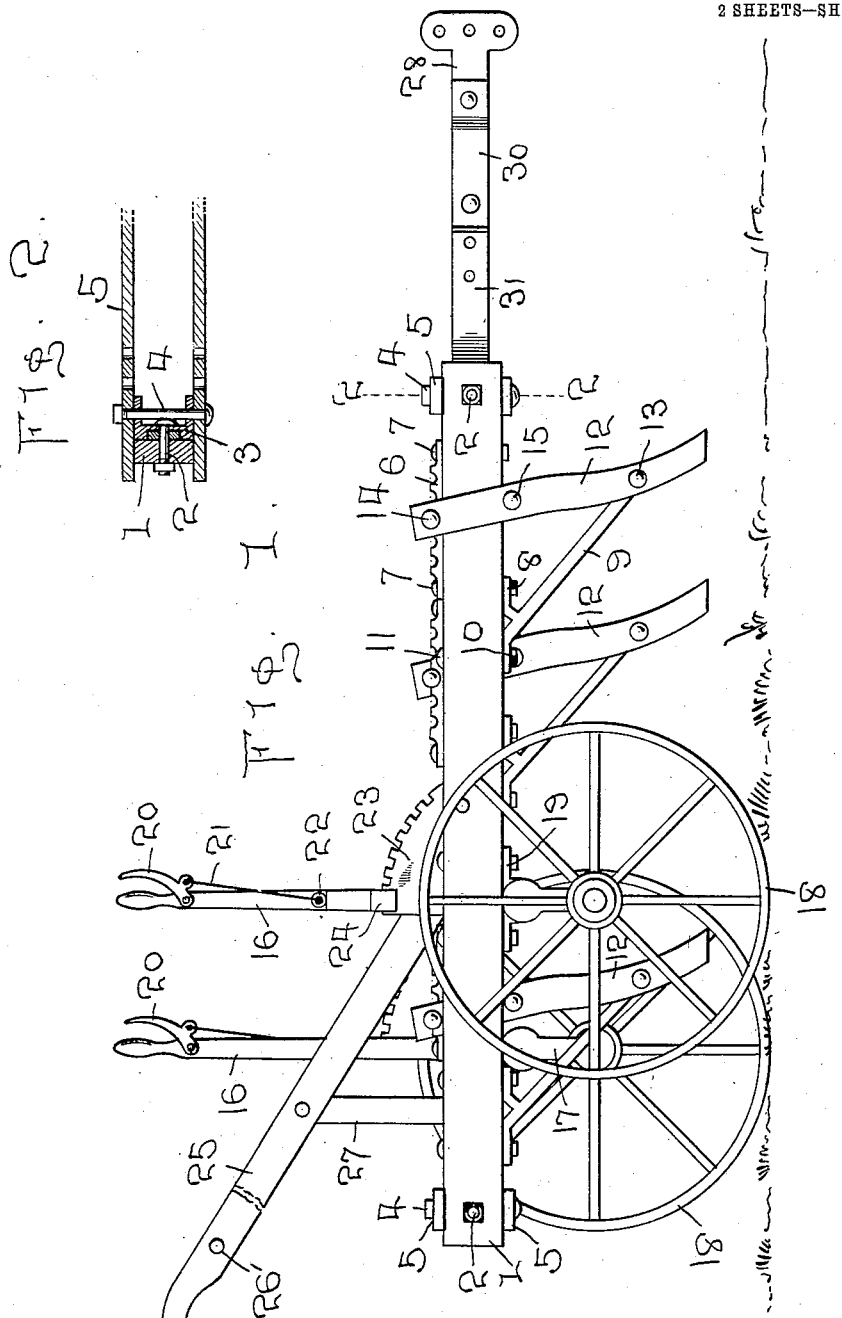

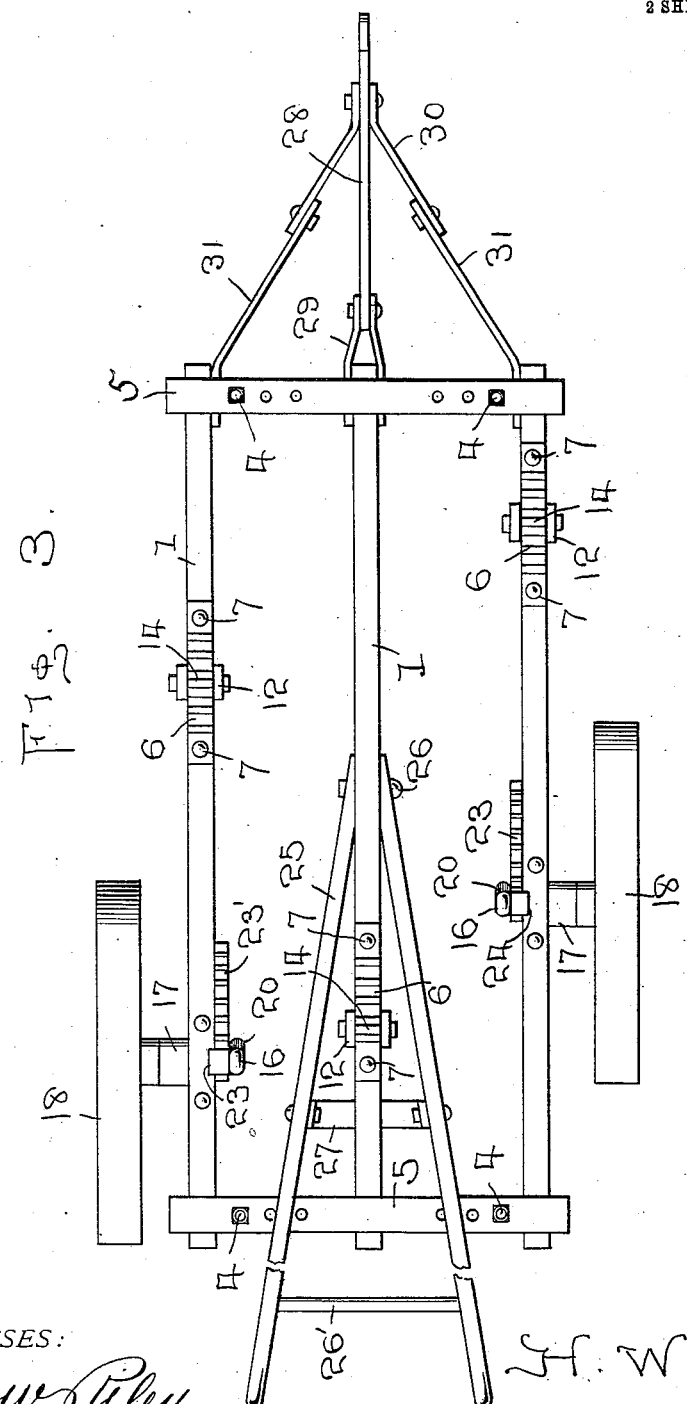

HAYWOOD WILLIAMS, OF ALTHEIMER, ARKANSAS.

PLOW.

1,018,465.     Specification of Letters Patent.     Patented Feb. 27, 1912.

Application filed July 1, 1911. Serial No. 636,397.

*To all whom it may concern:*

Be it known that I, HAYWOOD WILLIAMS, a citizen of the United States, residing at Altheimer, in the county of Jefferson and State of Arkansas, have invented certain new and useful Improvements in Plows; and I do hereby declare the following to be a full, clear, and exact description of the invention, such as will enable others skilled in the art to which it appertains to make and use the same.

This invention relates to farming implements and more particularly to plows.

An object of the invention is to provide a plow having an adjustable framework comprising transversely movable beams connected at their opposite ends by parallel end straps, one above the other.

Another object is to provide a plow of this character having wheels mounted on stub shafts connected with the outside movable beams in such manner that the frame work may be readily raised or lowered, as desired.

Another object is to provide a plow of this nature, either side of which may be raised or lowered independently of the other side and adjustable connections between the front end of the frame and the clevis, and, another object is to provide a plow of this character having the handles adjustably secured to the central beam of the frame and suitably braced, certain of the braces being also connected to the central beam.

Other objects and advantages will be hereinafter set forth and pointed out in the specification and claim.

In the accompanying drawings which are made a part of this application, Figure 1 is a side elevational view of the complete plow. Fig. 2 is a cross sectional view on the line 2—2 of Fig. 1, and, Fig. 3 is a top plan view of the complete implement.

Referring to the drawings in which similar reference numerals designate corresponding parts throughout the several views, 1 represents the longitudinal beams, of which I have shown three, but any number may be employed. Passing horizontally through each beam, near the opposite ends thereof, is a bolt 2, which also passes through the vertical portion of a spacing and connecting brace 3. The opposite ends of each brace 3 are turned at right angles to the vertical portion thereof and parallel to one another, and passing through these parallel ends of each brace 3 is the long bolt 4, which also is secured through one of the spaced openings provided therefor through the straps 5, one of which rests above the beams, while the other rests below said beams, said straps being parallel to one another and extending in a transverse direction. The openings through the straps 5 for the bolts 4 are suitably spaced from one another and are preferably located near the opposite ends, but if desired, may be continued the full length of the straps and any number of these openings may be provided. Thus it will be seen that by changing the proper bolts 4 to other openings through the straps 5, the beams 1 may be moved toward or away from one another, as desired.

The central beam 1 is preferably rigidly connected to the straps 5 at the opposite ends thereof at the central portions of the straps to hold the latter at the proper angles to the central beam and prevent the frame from collapsing.

Secured upon the upper side of each beam 1 are the transversely corrugated plates 6, which are secured in position by bolts 7 passing through the opposite ends thereof and downwardly through the beams. The bolt 7 passing through the rear end of each plate 6 also passes through the front arm 8 of the forked upper end of the plow foot brace 9, the rear arm 10 between the forked upper end of the brace 9 being secured to the underside of the beam 1 by a bolt 11, or other suitable means. Pivoted upon the lower edge of each brace 9 is the angularly adjustable standard 12, which is pivoted to the bars at the point 13, near the lower end of the standard. The standard 12 is preferably of the type composed of parallel irons connected at their lower ends and having their upper ends pressing upon the opposite sides of the beam and connected thereabove by the connecting pin or bolt 14, which rests within the corrugations of the plate, 6, the irons having also passing therethrough directly beneath the beam 1, a rivet or the like 15, which serves to brace the irons and hold them in proper spaced relation to one another, and at the same time prevent the standard from rising high enough to disengage the bolt 14 from within the corrugations of the plate 6, making it necessary to remove the bolt 14 and swing the standard upon its pivot pin 13 until the desired adjustment is obtained, after which the bolt 14 is replaced, resting within the proper corrugation.

The frame may be raised or lowered by swinging the levers 16, which have their lower ends secured upon the squared upper ends of the stub crank shafts 17, it being understood that a surface wheel 18 is mounted upon the lower rounded and outwardly extending end of each shaft 17. The upper end of each shaft is mounted within a suitable bracket 19, secured to the under face of one of the outer beams, and near the rear end thereof. It will be understood that either wheel 18 may be raised or lowered independently of the other and that one wheel is mounted considerably forwardly of the other. This is on account of the plow standard 12, mounted on the same beam as the forward wheel 18, being positioned near the front end of this beam, while the standard 12, carried below the other outer beam 1 is a short distance rearwardly of the first foot. The standard 12 carried by the central beam, is preferably positioned near the rear end of the frame, between the wheels 18. The purpose of this arrangement of the plow standard and the wheels will be readily understood.

When it is desired to raise or lower the plows carried upon the plow standard 12 to regulate the depth at which they are to penetrate the ground, the thumb latches 20 of the levers 16 are swung upon their pivots to press said fingers against the upper ends of the levers 16 and draw upon the wires 21, to raise the latches 22, carried upon the lower ends of the wires 21, from engagement with the teeth of the segment rack 23, secured to the outer beams 1, to allow the levers 16 to be swung in the proper direction, after which the thumb latches 20 are released and the latches 22 allowed to again engage the teeth of the rack 23 and hold the levers in proper position. The levers 16 are properly guided by the lower ends of the latch casings 24, which lower ends project over the teeth of the segment rack 23 and, thus, hold the levers 16 against the opposite sides of the segment racks 23 and the latch 22, directly above the rack teeth.

Secured to the opposite sides of the central beam 1, about midway the length of the beam, are the lower ends of the handles 25, which are secured thereto by the bolt 26, or other suitable means passing therethrough and through the beam 1. The handles 25 diverge toward their outer ends and are slanted upwardly, as is usual, the handles being spaced and held in proper relation to one another by means of the bar 26', extending from handle to handle near their upper ends. The handles 25 are also braced by the brace bars 27, which have their upper ends secured to the handles 25 and their lower ends to the central beam 1, said brace bars being vertical and connected to the handles 25 about midway their length.

The inner end of the clevis 28 is pivoted between the outer ends of the short straps 29, which have their outer ends bolted to the opposite sides of the central beam 1 at its outer end, said straps being bolted thereto by means of the bolt 2 passing through said straps and the outer end of this beam and securing the bars 3. Connected to the opposite sides of the clevis 28, near the outer end thereof, are the bent ends of the bracing straps 30, which have their inner ends pivoted to the irons 31, which are secured at their inner ends between the outer beams 1 and the braces 3, connected to the forward ends of these beams by means of the bolts 2, said bolts 2 also passing through the inner ends of the iron straps 31. It will thus be seen that the clevis 28 is connected to the frame in such manner as to allow the clevis to move upwardly or downwardly, as required, said clevis swinging upon the ends of the straps 29 and 31.

It will thus be seen that I have provided a plow having a framework composed of transversely adjustable beams and end straps between which the ends of the beams are secured, means for raising and lowering either side of the framework independently of the other, means for adjusting the angle of the plows or other implement carried upon the standards, and pivotal connections between the clevis and the frame, together with substantial handles secured to the center of the frame and securely braced in proper position. It will also be seen that this plow will be easy to manipulate and efficient in use. It will also be apparent that as all of the parts are of simple formation, the entire implement may be manufactured and marketed at an extremely low figure.

What I claim is:

A plow comprising parallel beams, braces having recesses in the vertical portion thereof and secured to the opposite inner ends of the outer beams, two-part adjustable brace straps having their inner ends received within said recesses, said braces having their opposite ends bent inwardly at right angles to the vertical portion, straps above and below said beams, means passing through the beams, bracing straps and straps for holding the beams in spaced relation, additional straps secured to the central beam and having a clevis pivoted to the outer ends thereof, said bracing straps having their outer ends secured to said clevis near the outer end thereof, and standards adjustably secured to said beams in staggered relation.

In testimony whereof I have signed my name to this specification in the presence of two subscribing witnesses.

HAYWOOD WILLIAMS.

Witnesses:
  GEORGE CULP,
  J. R. WALT.

Copies of this patent may be obtained for five cents each, by addressing the "Commissioner of Patents, Washington, D. C."